(12) United States Patent
Biswas et al.

(10) Patent No.: US 9,225,688 B2
(45) Date of Patent: Dec. 29, 2015

(54) METHOD AND APPARATUS FOR PROVIDING PRIVACY ADAPTATION BASED ON RECEIVER CONTEXT

(71) Applicant: Nokia Corporation, Espoo (FI)

(72) Inventors: Debmalya Biswas, Lausanne (CH); Matthew John Lawrenson, Bussigny-pres-de-lausanne (CH); Julian Nolan, Pully (CH)

(73) Assignee: Nokia Technologies Oy, Espoo (FI)

( * ) Notice: Subject to any disclaimer, the term of this patent is extended or adjusted under 35 U.S.C. 154(b) by 93 days.

(21) Appl. No.: 14/095,375

(22) Filed: Dec. 3, 2013

(65) Prior Publication Data

US 2015/0156171 A1    Jun. 4, 2015

(51) Int. Cl.
*H04L 29/06* (2006.01)

(52) U.S. Cl.
CPC ...................................... *H04L 63/04* (2013.01)

(58) Field of Classification Search
CPC ................................ H04L 63/04; H04L 29/06
USPC ............................................ 726/1, 12–13, 26
See application file for complete search history.

(56) References Cited

U.S. PATENT DOCUMENTS

| | | | |
|---|---|---|---|
| 5,544,321 A | 8/1996 | Theimer et al. | |
| 2008/0147796 A1* | 6/2008 | Chmara et al. | 709/204 |
| 2008/0155644 A1* | 6/2008 | Baranov et al. | 726/1 |
| 2008/0220760 A1* | 9/2008 | Ullah | 455/420 |
| 2011/0177802 A1 | 7/2011 | Gupta | |
| 2012/0102050 A1 | 4/2012 | Button et al. | |
| 2012/0254935 A1* | 10/2012 | Yato et al. | 726/1 |
| 2013/0091205 A1* | 4/2013 | Kotler et al. | 709/204 |
| 2013/0185359 A1 | 7/2013 | Liu et al. | |

OTHER PUBLICATIONS

Laura Zavala et al., "Mobile, Collaborative, Context-Aware Systems," University of Maryland, Baltimore County, Baltimore, MD 21250 USA Papers from the 2011 AAAI Workshop (WS-11-04), pp. 79-84.

* cited by examiner

*Primary Examiner* — Amir Mehrmanesh
(74) *Attorney, Agent, or Firm* — Ditthavong & Steiner, P.C.

(57) ABSTRACT

An approach is provided for determining a communication session established between at least one first device of at least one first user and at least one second device of at least one second user, wherein the at least one first device and the at least one second device are in a collaborative context detection relationship. The privacy platform causes, at least in part, a detection of a presence of at least one third user within a proximity threshold of the at least one first device, the at least one second device, the at least one first user, the at least one second user, or a combination thereof, wherein the detection is performed via the collaborative context detection relationship. The privacy platform also determines one or more modifications to one or more privacy profiles for information exchanged over the communication session based, at least in part, on the detection of the presence of the at least one third user.

18 Claims, 14 Drawing Sheets

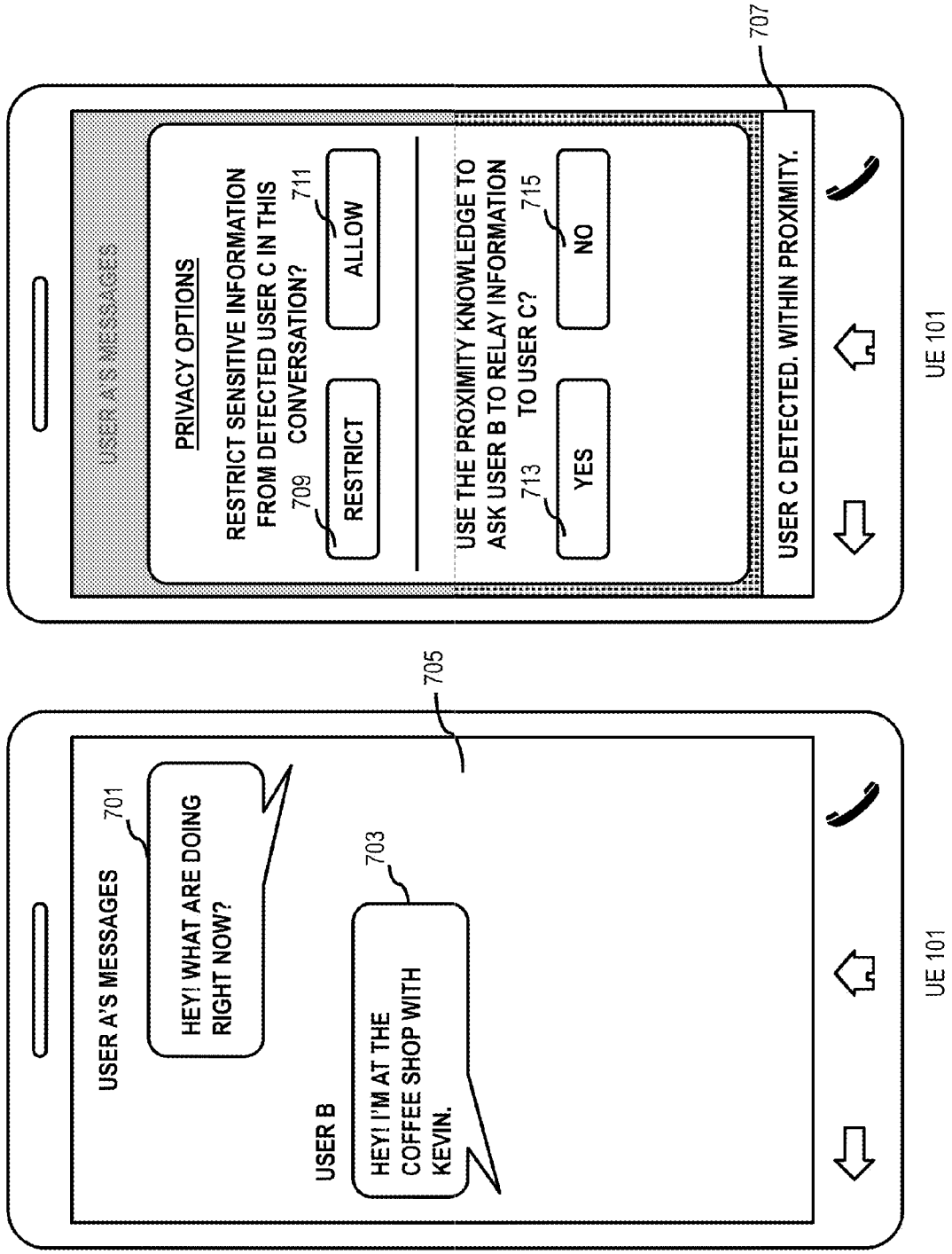

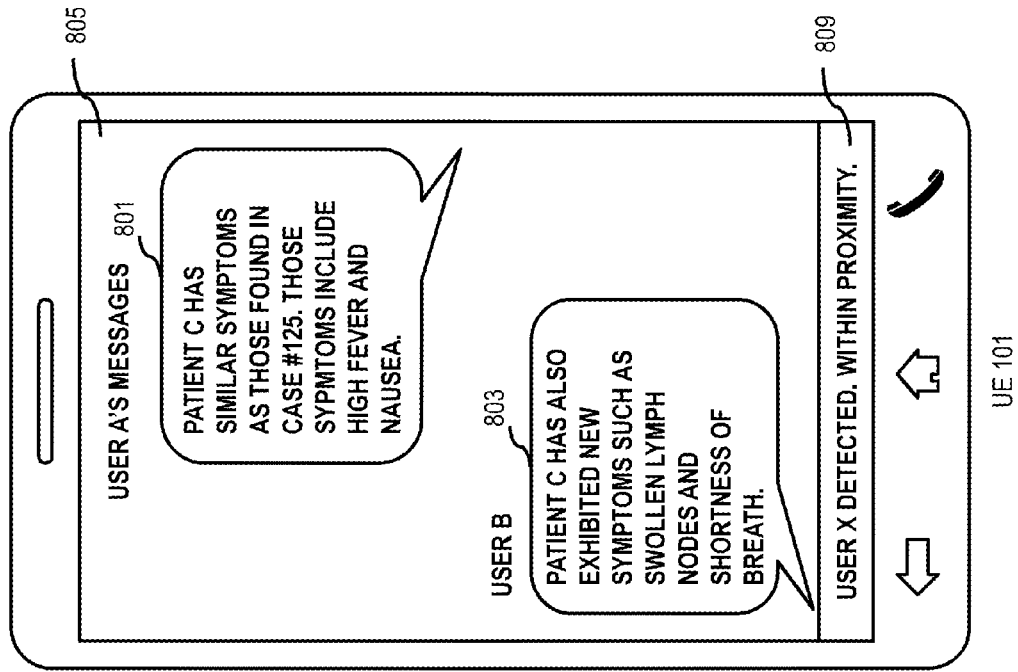
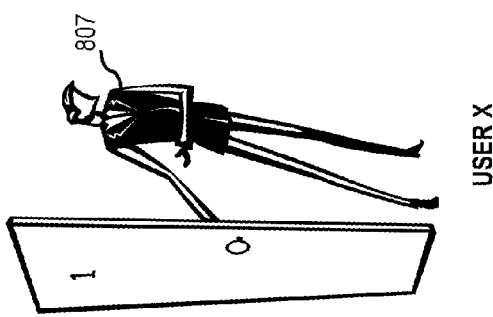
FIG. 8A

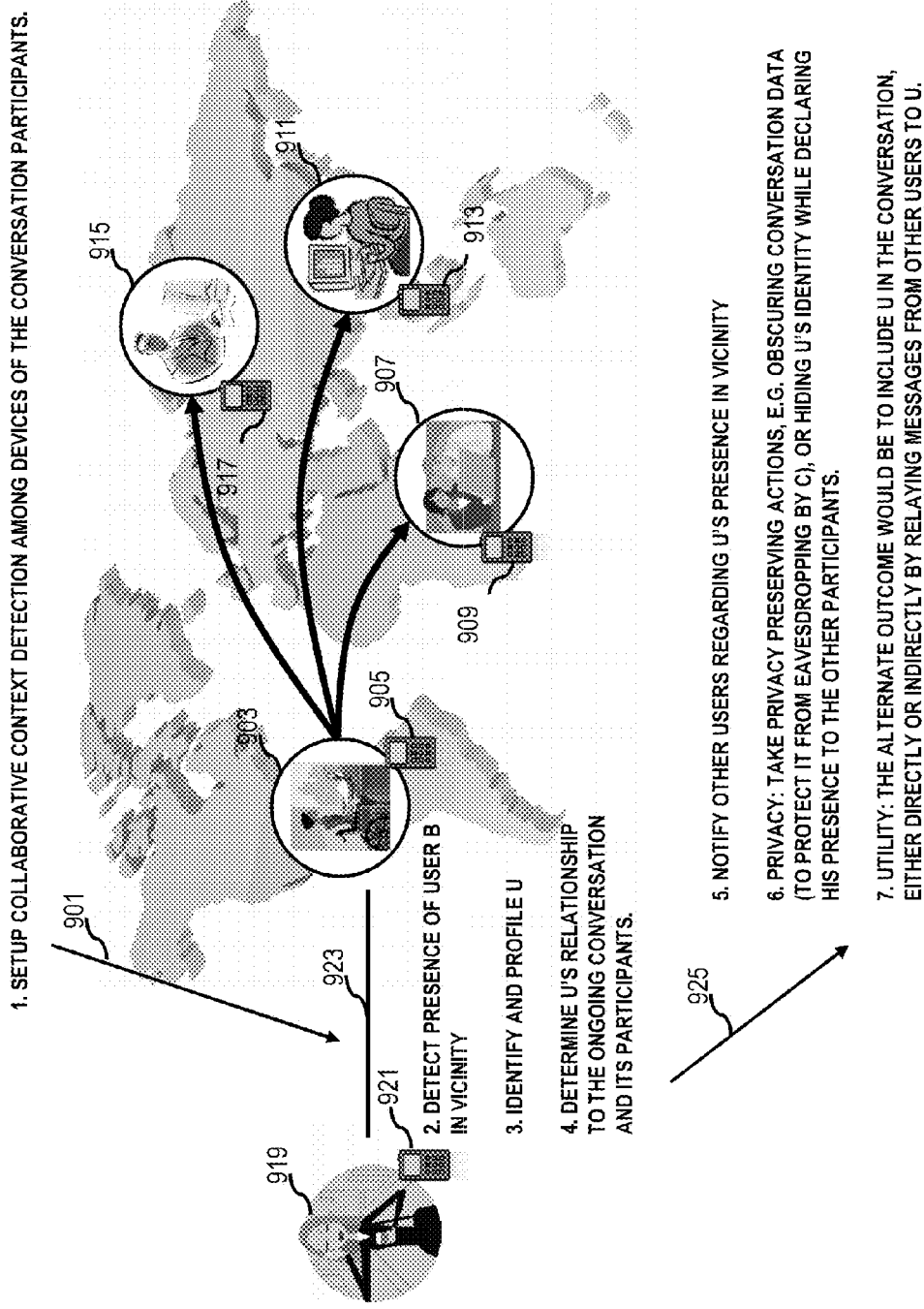

METHOD AND APPARATUS FOR PROVIDING PRIVACY ADAPTATION BASED ON RECEIVER CONTEXT

BACKGROUND

As context-aware applications become more popular, device manufacturers and service providers seek to improve the quality of services offered to context-aware application users. Trends in context-aware application have primarily focused on personalization, wherein a user's context is monitored in order to determine services for that user. However, such context-based services may vary depending on the context and proximity of other users in the vicinity, and whether the other users present security concerns. As a result, the context-aware applications needs to adapt the privacy policies of the at least one user in an ongoing communication session based on detection of other users within the vicinity by means of another user in the communication session. Thereby, determining one or more interaction modes for at least one user in a communication session in the presence of third.

SOME EXAMPLE EMBODIMENTS

Therefore, there is a need for an approach for determining modification to the privacy profile for information exchanged over the communication session between one or more devices in a collaborative context detection relationship based, at least in part, on the detection of the presence of the at least one other device within a proximity threshold.

According to one embodiment, a method comprises determining a communication session established between at least one first device of at least one first user and at least one second device of at least one second user, wherein the at least one first device and the at least one second device are in a collaborative context detection relationship. The method also comprises causing, at least in part, a detection of a presence of at least one third user within a proximity threshold of the at least one first device, the at least one second device, the at least one first user, the at least one second user, or a combination thereof, wherein the detection is performed via the collaborative context detection relationship. The method further comprises determining one or more modifications to one or more privacy profiles for information exchanged over the communication session based, at least in part, on the detection of the presence of the at least one third user.

According to another embodiment, an apparatus comprises at least one processor, and at least one memory including computer program code for one or more computer programs, the at least one memory and the computer program code configured to, with the at least one processor, cause, at least in part, the apparatus to determine a communication session established between at least one first device of at least one first user and at least one second device of at least one second user, wherein the at least one first device and the at least one second device are in a collaborative context detection relationship. The apparatus is also caused to cause, at least in part, a detection of a presence of at least one third user within a proximity threshold of the at least one first device, the at least one second device, the at least one first user, the at least one second user, or a combination thereof, wherein the detection is performed via the collaborative context detection relationship. The apparatus is further caused to determine one or more modifications to one or more privacy profiles for information exchanged over the communication session based, at least in part, on the detection of the presence of the at least one third user.

According to another embodiment, a computer-readable storage medium carries one or more sequences of one or more instructions which, when executed by one or more processors, cause, at least in part, an apparatus to determine a communication session established between at least one first device of at least one first user and at least one second device of at least one second user, wherein the at least one first device and the at least one second device are in a collaborative context detection relationship. The apparatus is also caused to cause, at least in part, a detection of a presence of at least one third user within a proximity threshold of the at least one first device, the at least one second device, the at least one first user, the at least one second user, or a combination thereof, wherein the detection is performed via the collaborative context detection relationship. The apparatus is further caused to determine one or more modifications to one or more privacy profiles for information exchanged over the communication session based, at least in part, on the detection of the presence of the at least one third user.

According to another embodiment, an apparatus comprises means for determining a communication session established between at least one first device of at least one first user and at least one second device of at least one second user, wherein the at least one first device and the at least one second device are in a collaborative context detection relationship. The apparatus also comprises means for causing, at least in part, a detection of a presence of at least one third user within a proximity threshold of the at least one first device, the at least one second device, the at least one first user, the at least one second user, or a combination thereof, wherein the detection is performed via the collaborative context detection relationship. The apparatus further comprises means for determining one or more modifications to one or more privacy profiles for information exchanged over the communication session based, at least in part, on the detection of the presence of the at least one third user.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a user interface diagram that represents a scenario of causing modifications to one or more privacy profiles for information exchanged over the communication session upon detection of the presence of the at least one third user, according to one example embodiment;

FIG. 8A-C are user interface diagrams that represents a scenario of causing one or more privacy preserving actions based on the relationship information, the identification information, the profile information, the privacy policy information, or a combination thereof, of at least one third user, according to one example embodiment;

FIG. 9 is a user interface diagram representing a conversation context adaptation based on third party users in the vicinity, according to one example embodiment;

DESCRIPTION OF SOME EMBODIMENTS

Examples of a method, apparatus, and computer program for determining modification to the privacy profile for information exchanged over the communication session between one or more devices in a collaborative context detection relationship based, at least in part, on the detection of the presence of the at least one other device within a proximity threshold are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

At present, context-aware applications are becoming increasingly mainstream. Such services are able to infer the user's context in real-time based on the many sensors embedded in the user's device, user's home, user's office, and even in public places. The gathered information is then used by the application to personalize their services for the user, to better suit the user's needs and preferences. Needless to mention, the context aware services has primarily focused on personalization of services by monitoring only the user's context, thereby not acknowledging the context information of other users in the vicinity. As a result, a specific challenge occurs when the context adaptation is based on the criteria of nearby users. In one scenario, the relationship between user A and user B may be static based on their pre-defined criteria or may be established dynamically whenever user A is interacting with user B via their respective UE 101. Such interaction between user A and user B may be affected by the presence of a third user C in B's vicinity. The presence of user C might have privacy implications with respect to the interaction between user A and user B if the information exchanged during the interaction is confidential in nature. On the other hand, user C being a malicious user may overhear the confidential conversation between user A and user B. As a result, users are left vulnerable to privacy threats.

Figure 1:
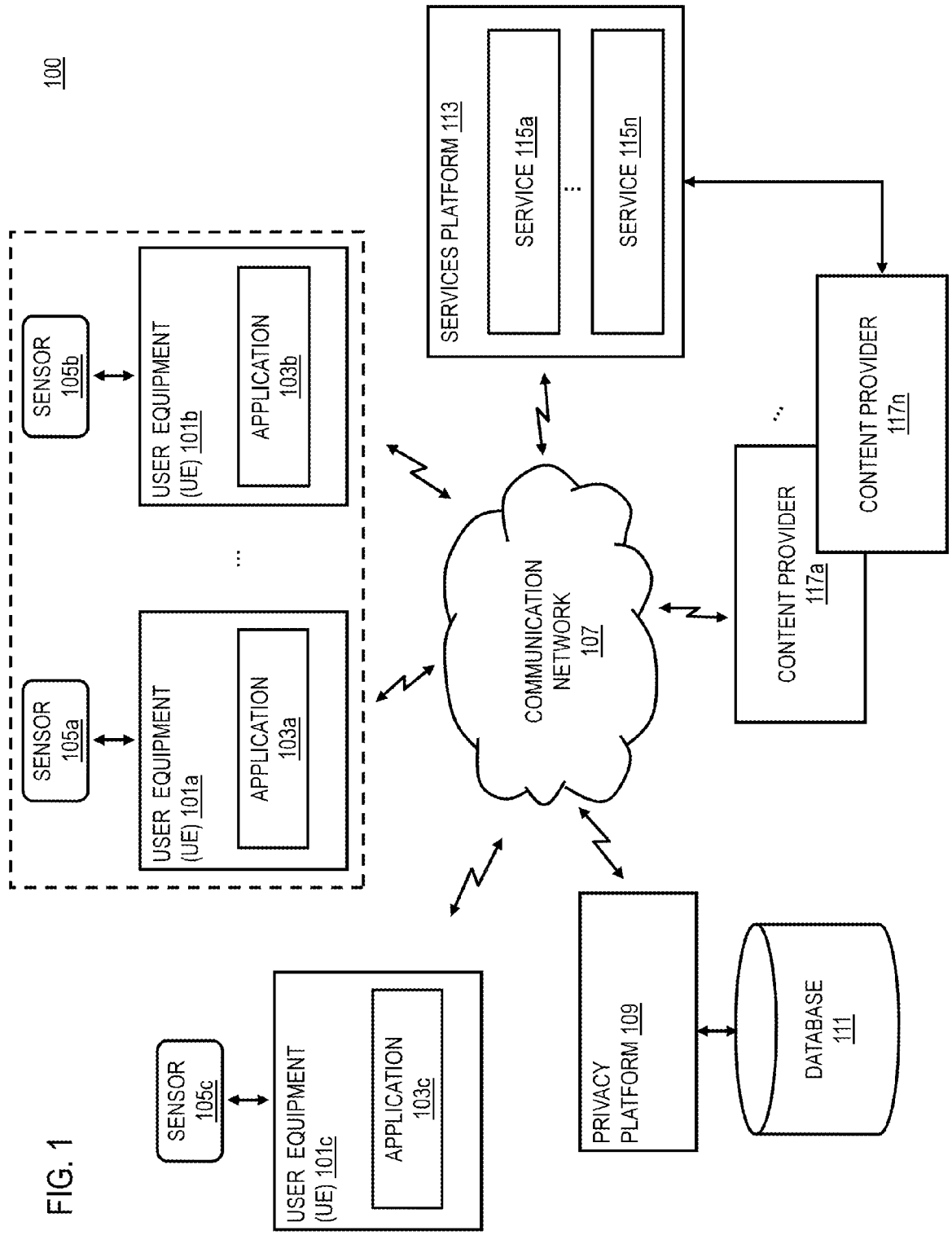
FIG. 1 is a diagram of a system capable of determining modification to the privacy profile for information exchanged over the communication session between one or more devices in a collaborative context detection relationship based, at least in part, on the detection of the presence of the at least one other device within a proximity threshold, according to one embodiment.

To address this problem, the system 100 of FIG. 1 introduces the capability to determine modification to the privacy profile for information exchanged over the communication session between one or more devices in a collaborative context detection relationship based, at least in part, on the detection of the presence of the at least one other device within a proximity threshold. In one embodiment, the variable factors that system 100 may take into consideration during context adaptation includes:

(a) Whether the interaction between the one or more users in an on-going communication session is sensitive?
(b) Whether the at least one detected third user within the proximity threshold of the one or more users in an on-going communication session is trustworthy?
(c) Whether the at least one detected third user within the proximity threshold of the one or more users in an on-going communication session adds value to the on-going conversation?

In one embodiment, the system 100 may determine the trustworthiness of the at least one detected third user within the proximity threshold of the one or more users in an on-going communication session by determining the identity information and/or reputation information of the at least one detected third user. In another embodiment, the system 100 may further determine any pre-existing relationship between the one or more users in the communication session and the at least one detected third user. In a further scenario, the system 100 may determine the proximity knowledge of the at least one third user, whereby the at least one user in the communication session may use the proximity information to determine whether to relay limited information to the at least one third user detected within the predetermined proximity. In one scenario, the privacy platform 109 may determine the above factors and assess them in an automated fashion during context adaptation, wherein the unreliability of context detection based on the one or more available sensors is also taken into account.

In one embodiment, the system 100 takes into consideration the privacy protection from the perspective of the at least one detected third user within the proximity threshold. In another embodiment, the system 100 may not reveal the presence of the at least one detected third user and/or his device to one or more users in an on-going communication session. In a further embodiment, the location information detected by the at least one user in an on-going communication session about the at least one third party within the proximity threshold may not be revealed to the other party(ies) in the communication session because such revelation might be harmful to the privacy of the at least one third user.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one example embodiment, user A and user B are engaged in an on-going communication session via their respective UE 101a and UE 101b, wherein the sensors 105a of UE 101a detects the presence of user C and/or UE 101c. Subsequently, the privacy platform 109 causes a modification in the privacy profile for the information exchanged during the conversation session between user A and user B based, at least in part, on the presence of user C in the vicinity.

In one embodiment, the applications 103 may be any type of application that is executable at the UE 101, such as, media applications (e.g., music and/or video streaming, photo exchange, etc.), social networking applications, content provisioning services, location-based services (e.g., providing proximity information), an internet browser, and the like. In another embodiment, the applications 103 may serve as the means by which the UE 101 and the privacy platform 109 interact. For example, the applications 103 may activate upon user request or upon prompting from the privacy platform 109 that at least one third user within a proximity threshold is detected. For example, the applications 103 may act as the intermediary through which the privacy platform 109 receives sensor information from a UE 101 and convey privacy policy modifications to the UE 101 back from the privacy platform 109.

By way of example, the sensors 105 may be any type of sensors. In certain embodiments, the sensors 105 may include, for example, a global positioning sensor for gathering location data, a network detection sensor for detecting wireless signals or network data, a camera/imaging sensor for gathering image data, and the like. In one embodiment, the sensors 105 may further include light sensors, tilt sensors, pressure sensors, audio sensors (e.g., microphone), or receivers for different short-range communications (e.g., Bluetooth, WiFi, etc.). In another embodiment, the sensors 105 may determine the current device context and may correlate the contextual information for verification of the sensitivity level for the information exchanged over the communication session.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the privacy platform 109 may be a platform with multiple interconnected components. The privacy platform 109 may include multiple servers, intelligent networking devices, computing devices, components and corresponding software for determining modification to the privacy profile for information exchanged over the communication session between one or more devices in a collaborative context detection relationship based, at least in part, on the detection of the presence of the at least one other device within a proximity threshold.

In one embodiment, the privacy platform 109 determines a communication session established between at least one first device of at least one first user and at least one second device of at least one second user, wherein the at least one first device and the at least one second device are in a collaborative context detection relationship. In one example embodiment, the privacy platform 109 may cause an arrangement of collaborative context detection among the devices of the participants in a communication session. Then, the privacy platform 109 may detect the presence of at least one other user in the vicinity, and may identify and profile the detected user. Subsequently, the privacy platform 109 may determine the detected user's relationship to the ongoing conversation and its participants. The privacy platform 109 may notify the users of the ongoing conversation regarding the presence of the detected user in the vicinity. Consequently, the privacy platform 109 may take privacy preserving actions or may include the detected user in the conversation, either directly, or indirectly by relaying messages from the users in the communication session.

In one embodiment, the privacy platform 109 causes, at least in part, a detection of a presence of at least one third user within a proximity threshold of the at least one first device, the at least one second device, the at least one first user, the at least one second user, or a combination thereof, wherein the detection is performed via the collaborative context detection relationship. In one scenario, the privacy platform 109 considers the dynamics of the at least one third user entering the conversation, and the interplay of the potential participant's context with either the originator or receiver's context. The privacy platform 109 uses the context of the at least one detected third user to adapt the ongoing conversation, while preserving the conversation privacy and those of the involved parties. In one scenario, the conversation among one or more users can be adapted based on the knowledge of the other users in the vicinity, wherein the privacy platform 109 may implement both a privacy perspective where confidential conversation can be better protected, as well as, a utility perspective where the potential new users in the vicinity that can contribute to the conversation are identified and included in the conversation.

In one embodiment, the privacy platform 109 determines one or more modifications to one or more privacy profiles for information exchanged over the communication session based, at least in part, on the detection of the presence of the at least one third user. In one scenario, the privacy platform 109 adapts user A's services, including his interaction with another user B, based on detection of a third user C in B's vicinity. Such adaptation allows achieving a privacy/utility trade-off with respect to user C's profile, and its impact on the on-going conversation between user A and user B. In one embodiment, the privacy platform 109 may take into consideration the following factors while performing the adaptation:
  (a) The privacy implications with respect to revealing C's presence to A, and vice versa;
  (b) The pre-existing relationships (if any) between the involved parties: A, B and C;
  (c) The conversation context and its confidentiality/sensitivity with respect to the involved parties; and
  (d) The unreliability of sensing/context detection.

In one embodiment, the technical steps involved in the remote context adaptation of user A's services/conversations based on user B's context are as follows:
  (a) Pre-existing (statically defined) relationship between user A and user B: This relationship can be in the form of a common application installed on both the participants' UE 101, to monitor their context and relay the information to the other party.
  (b) Dynamic relationship establishment: This relationship occurs when there is a negotiation between the context monitoring application installed on the UE 101 of the one or more participants to the on-going communication session. The negotiation between the monitoring application results in the following scenarios:
    (i) User A's application is given access to (remotely) control certain sensors on B's device, or
    (ii) User B's application agrees to monitor and relay output of a set of sensors on B's device to A's app. In one scenario, the sensors and the type of access allowed to the user data is selected based on the privacy policies of the one or more users. In an extended pre-existing relationship scenario, the set of applicable sensors can also include those available in the user's environment, for instance, home, office etc.
  (c) Adapt conversation based on context: In one scenario, user A adapts or controls the information he/she shares with user B in the on-going conversation, based on the knowledge of user B's context, and vice versa. In another scenario, user B's context includes current location information, emotional state information, physical activity information, and any other related information associated with user B to determine the best time to share sensitive information.

In one embodiment, the privacy platform 109 may adapt an ongoing conversation or interaction between two or more users based on the detection of at least one third party user in the vicinity. In one scenario, the solution can be generalized to a multi-party conversation, where the arrival of a new user in the vicinity can be detected by any of the participants in the conversation. As discussed, the new arrival can impact the ongoing conversation by either contributing positively to the conversation, or affecting its privacy. In one embodiment, the privacy platform 109 upon detection of the at least one third user C in the vicinity may adapt the ongoing conversation between user A and user B in a following manner:
  (a) Detection: The presence of one or more third party C is detected by:
    (i) Sensors in B's device, for example, camera, microphone.
    (ii) Door handle sensors or cameras in the room where user B is located.
  (b) Privacy: In one scenario, user B's UE 101 may notify user A regarding the presence of user C in the vicinity. In another scenario, the privacy platform 109 may consider the one or more privacy restrictions, wherein the privacy platform 109 may apply the following logic to determine whether user C's presence should be declared to user A:
    (i) Determine if there exists a pre-defined trust relationship between user A and user C. If the privacy platform 109 is of determination that there exists a pre-defined trust relationship user A is notified regarding the presence of user C in user B's vicinity.
    (ii) In one scenario if the privacy platform 109 is of determination that there does not exists a pre-defined trust relationship between user A and user C, the privacy platform 109 may read the privacy policies of user C, wherein the privacy platform 109 evaluate user C's privacy policies with respect to sharing his location with one or more users matching user A's profile. If allowed, the privacy platform 109 may relay proximity information of user C to user B, to user A.

In one embodiment, if the privacy platform 109 is of determination that the privacy policies are not supported, the alternative is to get an explicit opt-in from user C. In one scenario, user B's UE 101 may interact with user C's UE 101, to get his explicit approval, before disclosing his presence to user A. In one scenario, where none of the above mentioned sharing options are available because of the restrictive privacy policies of user C, the privacy platform 109 may still declare the proximity of user C to user A while obscuring user C's identity, for example, "Unknown user(s) in the vicinity of B". In a multi-party scenario of n users, if the presence of $U_n+1^{th}$ user is detected by user $U_i$, then the above process will need to be performed with all the remaining n−1 users.

In one embodiment, the privacy platform 109 may counterbalance the privacy concerns by determining the contribution that user C can make to the ongoing conversation between user A and user B. This requires the privacy platform 109 to determine the conversation context between user A and user B, and then infer user C's relationship to the conversation. In another embodiment, the privacy platform 109 may determine the conversation context and the tone based, at least in part, on the keywords used in the conversation. Further, user C's relationship to the conversation can determined based on his/her profile relationship to the identified keywords. In addition, user C's relationship with the other conversation participants can also be used as a basis to determine user C's relationship to the conversation.

In one embodiment, the privacy platform 109 may determine unreliability with regards to information of one or more user detected within the vicinity depending on the accuracy of the sensing mechanism implemented. In one scenario, an uncertainty can be with respect to:
  (a) Identity: 'User C' is in the room versus 'someone' is in the vicinity.
  (b) Trust: Trust level that exists between A and B, B and C, A and C.
  (c) Data sensitivity: The confidentiality level of data shared in the conversation, and how it relates to user C.

In one embodiment, the privacy platform 109 may accommodate the unreliability in sensing by taking privacy preserving actions, for example, obscuring certain parts of the conversation, stopping the conversation altogether upon detecting a third user in the vicinity whose identity or relationship to the conversation cannot be ascertained etc. As discussed earlier, the presence of such a user can still be notified to the other conversation participants, for example, "Unknown user(s) in vicinity of B".

In one embodiment, the privacy platform 109 may include or have access to the database 111 to access or store any kind of data associated with one or more UE 101. In another embodiment, the privacy platform 109 may determine sensitivity level for one or more information exchanged over the communication session, the relationship information, the identification information, the profile information, the privacy policy information, or a combination thereof for at least one UE 101 by comparing the one or more data with the one or more data stored in the database 111. The data stored in the database 111 may, for instance, be provided by the UE 101, the services platform 113, one or more services 115a-115n (herein after services 115), or one or more content providers 117a-117n (herein after content providers 117).

The services platform 113 may include any type of service. By way of example, the services platform 113 may include social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the privacy platform 109 and the content providers 117 to supplement or aid in the processing of the content information. In another embodiment, the services platform 113 may provide the privacy platform 109 with user preference information, contextual information etc., to assist the privacy platform 109 in determining one or more privacy protecting actions for information exchanged over the communication session.

By way of example, services 115 may be an online service that reflects interests and/or activities of users. In one scenario, the services 115 provide representations of each user (e.g., a profile), his/her social links, and a variety of additional information. The services 115 allow users to share activities information, contextual information, and interests within their individual networks, and provides for data portability. The services 115 may additionally assist in providing the privacy platform 109 in determining sensitivity levels for one or more information exchanged over the communication session. In one embodiment, the services 115 may further assist the privacy platform 109 in profile mapping to protect the privacy interest of the one or more users in a communication session. In another embodiment, the accessibility of the information exchanged over the communication session by one or more services may be determined based, at least in part, on their reliability and trustworthiness. Further, user privacy profiles may be specific to each service, for example, services 115 may deduce privacy profile settings based on user settings with similar or analogous services using the same data.

The content providers 117 may provide content to the UE 101, the privacy platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid the privacy platform 109 in determining suitable privacy preserving actions for information exchanged over the communication session based, at least in part, on their sensitivity level. In one embodiment, the content providers 117 may also store content associated with the UE 101, the privacy platform 109, and the services 115 of the services platform 113. In another embodiment, the content providers 117 may manage access to a central repository of data, and offer a consistent, standard interface to user's data.

By way of example, the UE 101, the privacy platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
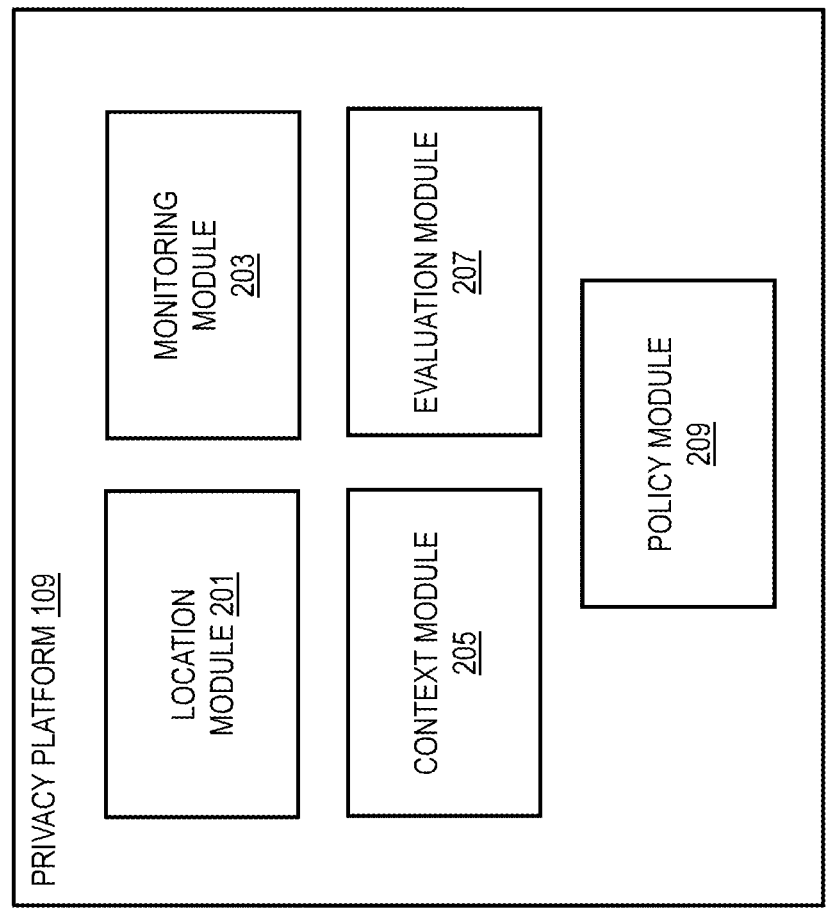
FIG. 2 is a diagram of the components of the privacy platform 109, according to one embodiment.

FIG. 2 is a diagram of the components of the privacy platform 109, according to one embodiment. By way of example, the privacy platform 109 includes one or more components for determining modification to the privacy profile for information exchanged over the communication session between one or more devices in a collaborative context detection relationship based, at least in part, on the detection of the presence of the at least one other device within a proximity threshold. It is contemplated that the functions of these components may be combined in one or more components or performed by other components of equivalent functionality. In this embodiment, the privacy platform 109 includes a location module 201, a monitoring module 203, a context module 205, an evaluation module 207 and a policy module 209.

In one embodiment, the location module 201 determines the location of UEs 101a-101c. The location module 201 may determine the location in real-time and refresh the location information as the users carrying the UEs 101a-101c are on the move. The real-time location information enables the location module 201 to keep track of the travel path for each UE 101. Furthermore, the location module 201 may be located on the UE 101, to collect location information associated with each UE 101, and transmit the collected information to the privacy platform 109. In one scenario, the privacy platform 109 may detect the presence of at least one other UE 101 within a proximity threshold based, at least in part, on the information provided by the location module 201.

In one embodiment, the monitoring module 203 monitors the proximity information, the relationship information, the identification information, the profile information, the privacy policy information, or a combination thereof associated with UE 101a-101c in a collaborative context detection relationship. The monitoring module 203 may monitor such information in real-time, periodically, based on a pre-determined schedule, based on demands from one or more UEs 101a-101c, based on demands from the policy module 209, or a combination thereof. The policy module 209 uses the collected information via the monitoring module 203 for determining the privacy policies.

In one embodiment, the context module 205 determines the context of an ongoing communication session and its sensitivity with respect to the involved parties. In one embodiment, the context module 205 may be in the form of a common application installed on the respective UE 101's of the participants in a communication session, wherein the context module 205 may monitor the context and may relay the information to the other party in the communication session. In another scenario, such collaborative context detection relationship enables access of one or more sensors associated with the at least one second device by the at least one first device in the communication session for detecting the presence of the at least one third user In one embodiment, the evaluation module 207 may evaluate the sensitivity level of at least one communication session between one or more parties. In another embodiment, the evaluation module 207 may determine the trustworthiness of the at least one third user within a proximity threshold, for example, the evaluation module 207 may retrieve the reputation information of the at least one third user, for example, to determine whether the at least one third user is a malicious user. In a further embodiment, the evaluation module 207 may determine if the at least one third user has a pre-existing relationship with the users in the ongoing communication session to further determine whether the third user can add additional value in the ongoing conversation.

In one embodiment, the policy module 209 may process the context of the third user within a proximity threshold to adapt an ongoing communication session established between at least one first device of at least one first user and at least one second device of at least one second user while preserving the privacy of the communication session. In one embodiment, the at least one privacy preserving action may include obscuring of data transmitted over the communication session, for example, encrypting the data using various cryptography methods in order to prevent unauthorized access to the data. In another embodiment, the policy module 209 may implement various privacy preserving actions, for example, hiding of the presence of the at least one third user and/or hiding of the identification information of the at least one third user and/or hiding of other identification information of the at least one first user and the at least one second user etc.

The above presented modules and components of the privacy platform 109 can be implemented in hardware, firmware, software, or a combination thereof. Though depicted as a separate entity in FIG. 1, it is contemplated that the privacy platform 109 may be implemented for direct operation by respective UE 101. As such, the privacy platform 109 may generate direct signal inputs by way of the operating system of the UE 101 for interacting with the applications 103. In another embodiment, one or more of the modules 201-209 may be implemented for operation by respective UEs, as a privacy platform 109, or combination thereof. Still further, the privacy platform 109 may be integrated for direct operation with services 115, such as in the form of a widget or applet, in accordance with an information and/or subscriber sharing arrangement. The various executions presented herein contemplate any and all arrangements and models.

Figure 3:
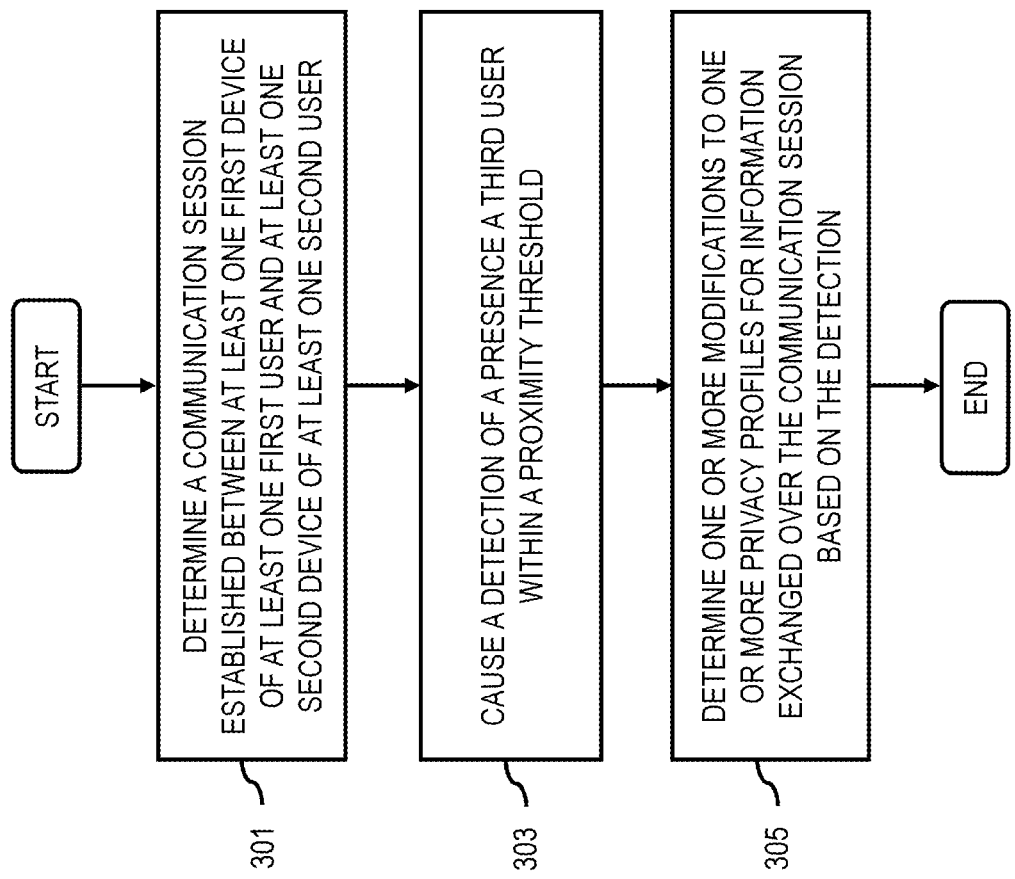
FIG. 3 is a flowchart of a process for adapting privacy profiles between one or more users in an ongoing communication session upon detecting a third user within the proximity threshold, according to one embodiment.
Figure 11:
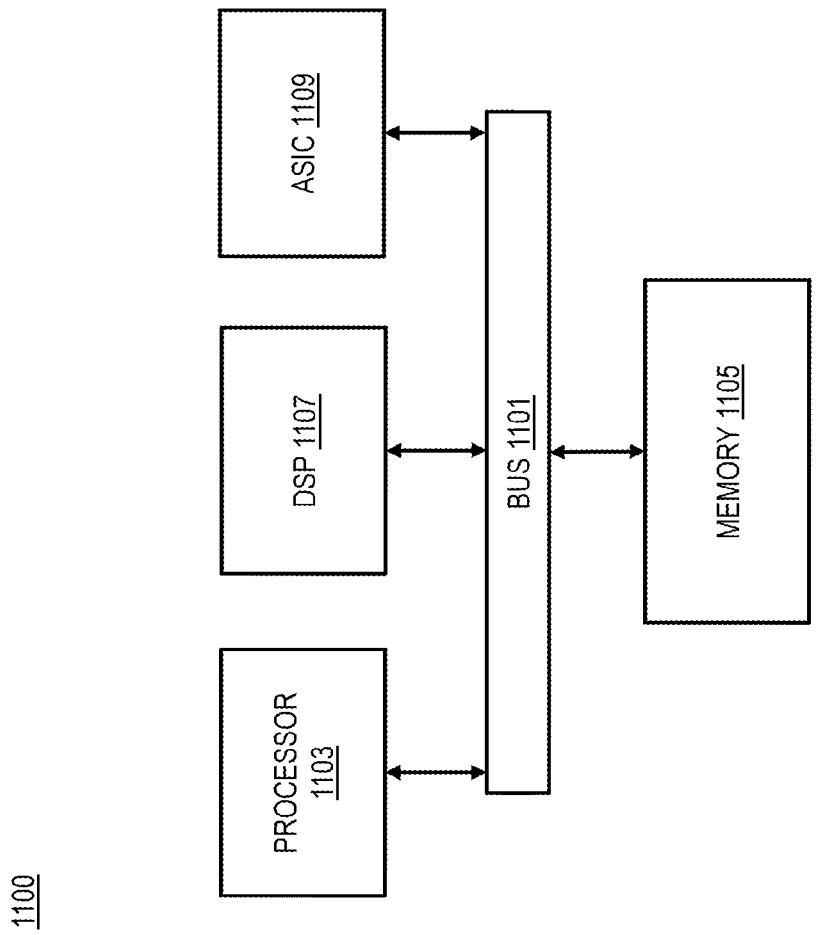
FIG. 11 is a diagram of a chip set that can be used to implement an embodiment of the invention.

FIG. 3 is a flowchart of a process for adapting privacy profiles between one or more users in an ongoing communication session upon detecting a third user within the proximity threshold, according to one embodiment. In one embodiment, the privacy platform 109 performs the process 300 and is implemented in, for instance, a chip set including a processor and a memory as shown in FIG. 11.

In step 301, the privacy platform 109 determines a communication session established between at least one first device of at least one first user and at least one second device of at least one second user, wherein the at least one first device and the at least one second device are in a collaborative context detection relationship. In one embodiment, the collaborative context detection relationship enables the at least one first device to access one or more sensors associated with the at least one second device for detecting the presence of the at least one third user. In another embodiment, the one or more sensors include, at least in part, one or more internal sensors of at least one second device, one or more external sensors accessible by the at least one second device, or a combination thereof.

In step 303, the privacy platform 109 causes, at least in part, a detection of a presence of at least one third user within a proximity threshold of the at least one first device, the at least one second device, the at least one first user, the at least one second user, or a combination thereof, wherein the detection is performed via the collaborative context detection relationship. In one scenario, the privacy platform 109 causes collaborative context detection among the UE 101s of the conversation participants to detect the presence of one or more other users in the vicinity. In another scenario, such collaborative context detection mechanism assists in determining the identity information, profile information, relationship information, privacy profile information, or a combination thereof between the at least one first user and the at least one second user engaged in an on-going communication session, and the at least one detected third user.

In step 305, the privacy platform 109 determines one or more modifications to one or more privacy profiles for information exchanged over the communication session based, at least in part, on the detection of the presence of the at least one third user. In one embodiment, the privacy platform 109 causes one or more privacy preserving actions, for example, the privacy platform 109 may obscure the information exchanged between user A and user B during a communication session upon detection of the presence of user C in the vicinity. The obscuring of the information is done to prevent user C from spying on the information. In one scenario, the privacy platform 109 may completely prevent user C from accessing the information exchanged between user A and user B, or may allow partial access to the information. The privacy platform 109 may make such determination based, at least in part, on a trusted relationship created with user C. In another scenario, the privacy platform 109 may create a trusted relationship with user C upon processing of the identity information, profile information, relationship information, privacy policy information, or a combination thereof associated with user C. In a further scenario, the privacy platform 109 may hide the identity of user C while declaring his/her presence to user A and user B, thereby causing any modification to the privacy profile as required.

Figure 4:
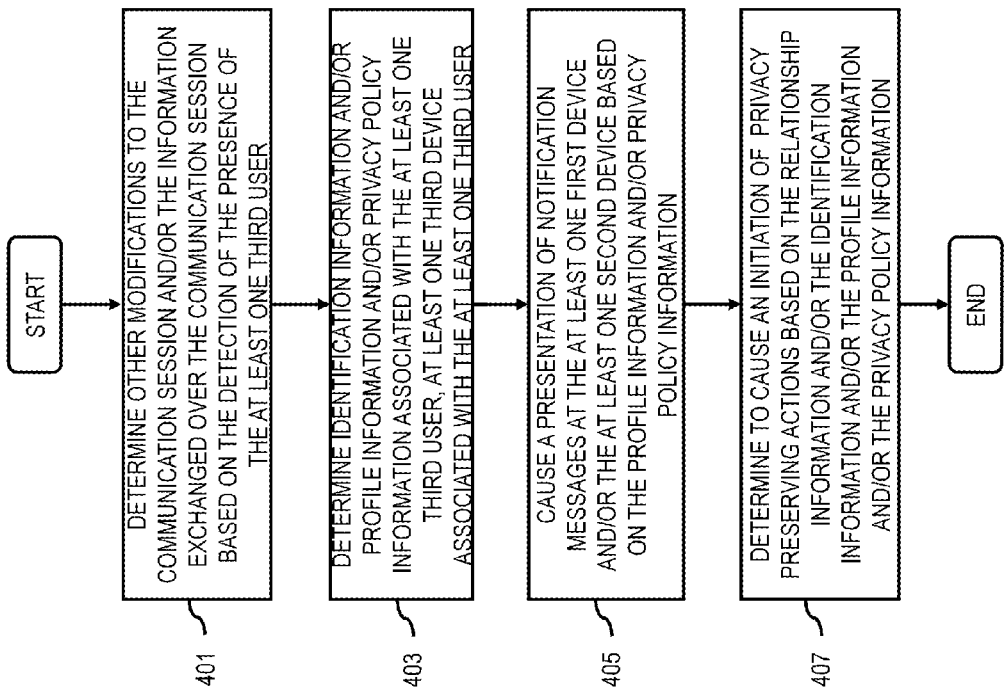
FIG. 4 is a flowchart of a process for determining other modifications and privacy preserving actions based, at least in part, on the identification information, profile information, privacy policy information, relationship information, or a combination thereof, according to one embodiment.

FIG. 4 is a flowchart of a process for determining other modifications and privacy preserving actions based, at least in part, on the identification information, profile information, privacy policy information, relationship information, or a combination thereof, according to one embodiment. In one embodiment, the privacy platform 109 performs the process 400 and is implemented in, for instance, a chip set including a processor and a memory as shown in FIG. 11.

In step 401, the privacy platform 109 determines one or more other modifications to the communication session, the information exchanged over the communication session, or a combination thereof based, at least in part, on the detection of the presence of the at least one third user. In one scenario, user A and user B are in a communication session, wherein user A has access to user B's context information in terms of user B's location and nearby users. In a further scenario, assuming user C is approaching user B, then user A may access the output of user B's sensors to detect user C, and may request user C's privacy profile while in conversation with user B. Further, user A may control user B's sensors to detect the possible appearance of user C nearby and identify user C through the detection under the control of user B. In addition, user A may determine user C's privacy profile as if user C's profile is in user A's address book, or that user A is able to send a query to user C to obtain user C's privacy profile. Then, the privacy platform 109 may adapt the privacy profile of user A and user B to cause a modification in the communication session and/or the information exchanged over the communication session.

In step 403, the privacy platform 109 determines identification information, profile information, privacy policy information, or a combination thereof associated with the at least one third user, at least one third device associated with the at least one third user, or a combination thereof. In one scenario, the privacy platform 109 may detect at least one third person within a proximity threshold, whereby the privacy platform 109 may take several actions based on the reliability of the context detection, for example, the privacy platform 109 may process the identification information and/or the profile information of the detected third person. Then, the privacy platform 109 may identify the at least one third person as user C who has a pre-existing relationship with user A. In another scenario, the privacy platform 109 may determine the privacy policies associated with the one or more user in the communication session and the at least one third user within the proximity threshold to determine the sharing of information exchanged during the communication session.

In step 405, the privacy platform 109 causes, at least in part, a presentation of one or more notification messages at the at least one first device, the at least one second device, or a combination thereof based, at least in part, on the profile information, privacy policy information, or a combination thereof, wherein the one or more notification messages relate, at least in part, to the presence of the at least one third user. In one scenario, user B is engaged in an on-going communication session with user A, wherein user B detects the presence of the at least one other user within a close proximity to user B. Then, the privacy platform 109 identifies and profiles the detected other user, for example, the privacy platform 109 may determine the detected other user to be user C. Subsequently, the privacy platform 109 determines the relationship of user C to the ongoing conversation and its participants user A and B. Consequently, the privacy platform 109 may notify user A and user B about the presence of user C in the vicinity based, at least in part, on the determined information.

In step 407, the privacy platform 109 determines whether to cause, at least in part, an initiation of one or more privacy preserving actions based, at least in part, on the relationship information, the identification information, the profile information, the privacy policy information, or a combination thereof. In one embodiment, the one or more privacy preserving actions include, at least in part, (a) obscuring of data transmitted over the communication session; (b) hiding of the presence of the at least one third user; (c) hiding of the identification information of the at least one third user; (d) hiding of other identification information of the at least one first user, the at least one second user, or a combination thereof; or (e) a combination thereof.

Figure 5:
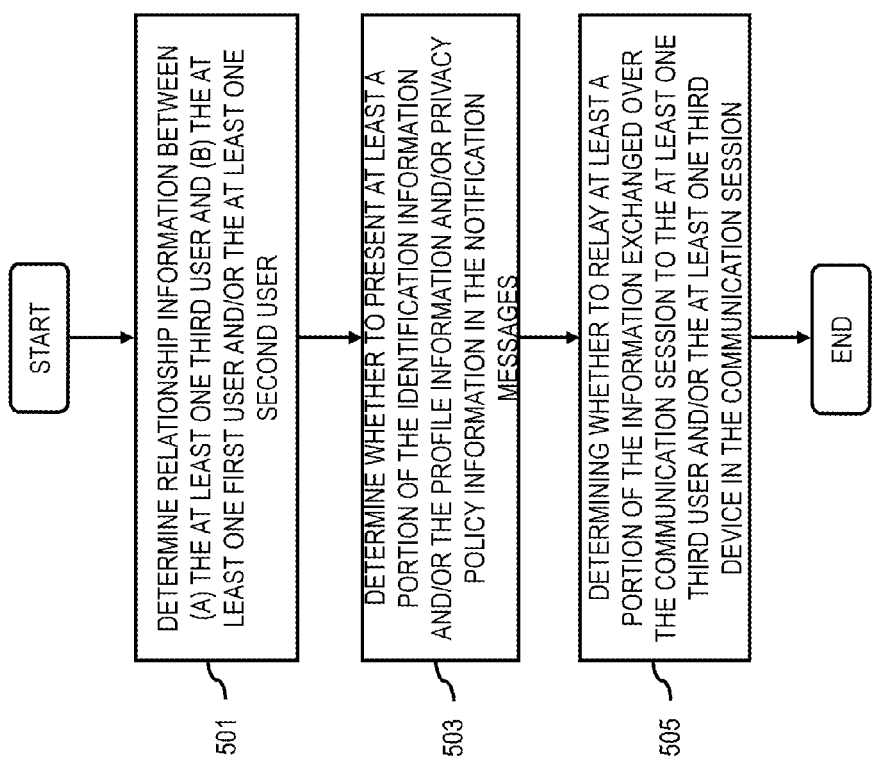
FIG. 5 is a flowchart of a process for determining relationship information to cause a presentation of other information, and further determining whether to relay a portion of the information exchanged over the communication session between the at least one third user and the one or more users in the ongoing communication session, according to one embodiment.

FIG. 5 is a flowchart of a process for determining relationship information to cause a presentation of other information, and further determining whether to relay a portion of the information exchanged over the communication session between the at least one third user and the one or more users in the ongoing communication session, according to one embodiment. In one embodiment, the privacy platform 109 performs the process 500 and is implemented in, for instance, a chip set including a processor and a memory as shown in FIG. 11.

In step 501, the privacy platform 109 determines relationship information between (a) the at least one third user and (b) the at least one first user, the at least one second user, or a combination thereof. In one scenario, the privacy platform 109 may determine relationship of the at least one third user to the on-going communication session and its participant, wherein the relationship may be pre-existing or dynamic. In another scenario, the privacy platform 109 may determine a pre-defined trust relationship between the at least one third user, and the at least one first user and/or the at least one second user. In a further scenario, the privacy platform 109 may determine the conversation context of the at least one first user and the at least one second user, and may determine the relationship of the at least one detected third user to the conversation by inferring his/her relationship to the conversation, if any.

In step 503, the privacy platform 109 determines whether to present at least a portion of the identification information, the profile information, privacy policy information, or a combination thereof in the one or more notification messages based, at least in part, on the relationship information. In one scenario, the privacy platform 109 may identify at least one third user and may determine his/her relationship with the ongoing conversation and the participants to the conversation. Then, the privacy platform 109 may notify the at least one first user and the at least one second user in the communication session about the presence of the at least one third user in the vicinity. In another scenario, if the privacy platform 109 is unable ascertain the identity of the detected third user or his/her relationship to the on-going conversation session, the privacy platform 109 may notify the presence of such user as "Unknown user in vicinity of B".

In step 505, the privacy platform 109 determines whether to relay at least a portion of the information exchanged over the communication session to the at least one third user, the at least one third device, or a combination thereof in the communication session based, at least in part, on the relationship information, the identification information, the profile information, the privacy policy information, or a combination thereof. In one scenario, the privacy platform 109 may evaluate the privacy policies of the one or more users in the communication session to determine whether to relay the information exchanged to the at least one third user. In another scenario, for the purpose of relaying information, the privacy platform 109 may process relationship information and/or the profile information of the at least one third user to determine whether the at least one third user may add value to the on-going conversation. In addition, the privacy platform 109 may process the relationship information and/or the profile information of the at least one third user to determine his/her trustworthiness.

Figure 6:
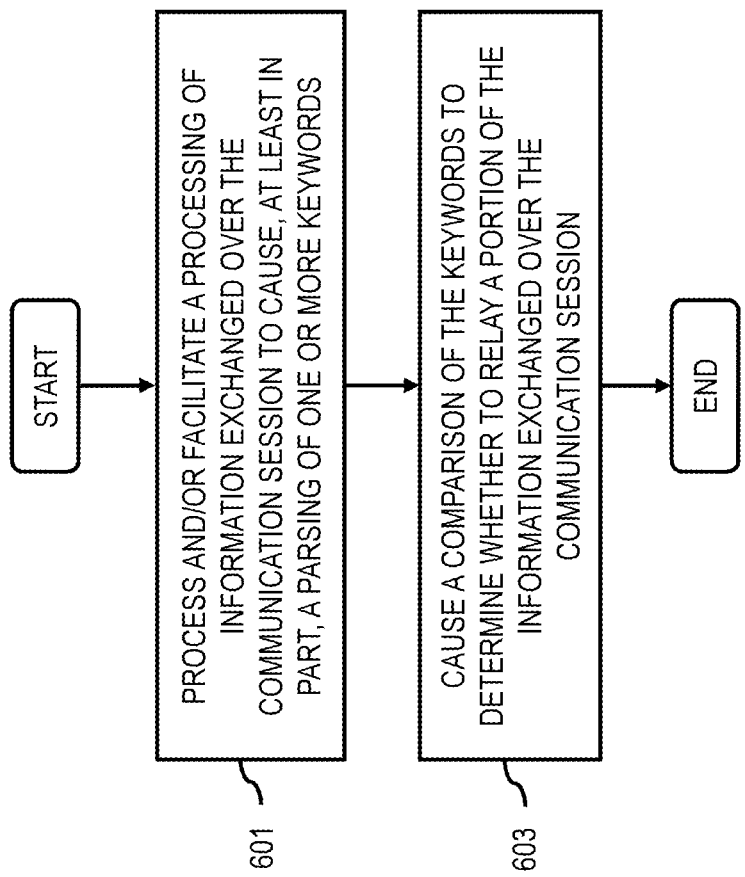
FIG. 6 is a flowchart of a process for causing a parsing of one or more keywords and causing comparison of the keywords to determine their sensitivity level for the purpose of relaying information, according to one embodiment.

FIG. 6 is a flowchart of a process for causing a parsing of one or more keywords and causing comparison of the keywords to determine their sensitivity level for the purpose of relaying information, according to one embodiment. In one embodiment, the privacy platform 109 performs the process 600 and is implemented in, for instance, a chip set including a processor and a memory as shown in FIG. 11.

In step 601, the privacy platform 109 processes and/or facilitates a processing of information exchanged over the communication session to cause, at least in part, a parsing of one or more keywords. In one scenario, the privacy platform 109 may determine the confidentiality of the information exchanged during the communication session based, at least in part, on the presence of one or more keywords in the conversation that denotes secrecy, for example, the privacy platform 109 may determine the sensitivity level of a communication based on the medical keywords in the conversation.

In step 603, the privacy platform 109 causes, at least in part, a comparison of the one or more keywords against the relationship information, the identification information, the profile information, the privacy policy information, or a combination thereof to determine whether to relay at least a portion of the information exchanged over the communication session to the at least one third user, the at least one third device, or a combination thereof. In one scenario, the privacy platform 109 may determine the relationship between the at least one third user within the proximity threshold and the communication session based on his/her profile relationship to the identified keyword. In another scenario, the privacy platform 109 may determine whether the at least one detected third user is trustworthy by determining his/her identity. The privacy platform 109 may further retrieve the reputation information of the at least one detected third user, and determine if the at least one third user shares a pre-existing relationship with the one or more parties in the ongoing communication session.

FIG. 7 is a user interface diagram that represents a scenario of causing modifications to one or more privacy profiles for information exchanged over the communication session upon detection of the presence of the at least one third user, according to one example embodiment. In one scenario, user A [701] is chatting with user B [703] via his UE 101 [705]. User A has access to user B's context information in terms of user B's location and nearby users, for example, user B's colleague user C is nearby user B [707]. In another scenario, the accessed contextual information may be used by user A to either restrict the sharing of the sensitive information shared with user B during the conversation with user C [709] or allow the sharing of the information with user C [711]. In a further scenario, user A may use the proximity knowledge to ask user B to relay some information to user C [713] or not [715]. In such a manner the conversation or the interaction amongst multiple users can be adapted based on the knowledge of the other users in the vicinity. The conversation benefits are both from a privacy perspective where confidential conversation can be better protected, as well as from a utility perspective where potential new users in the vicinity that can contribute to the conversation are identified and included in the conversation.

Figure 8B:
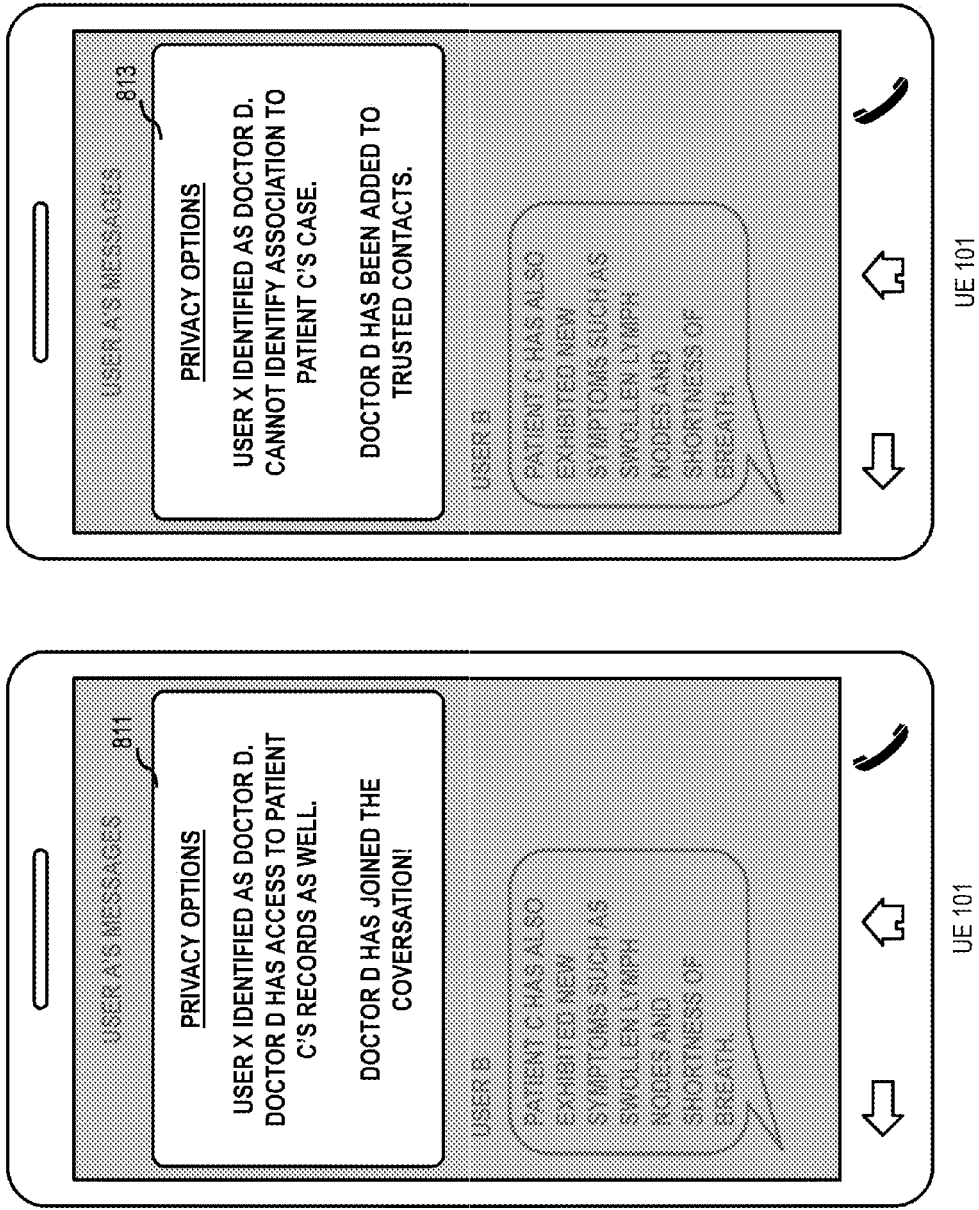
Figure 8C:
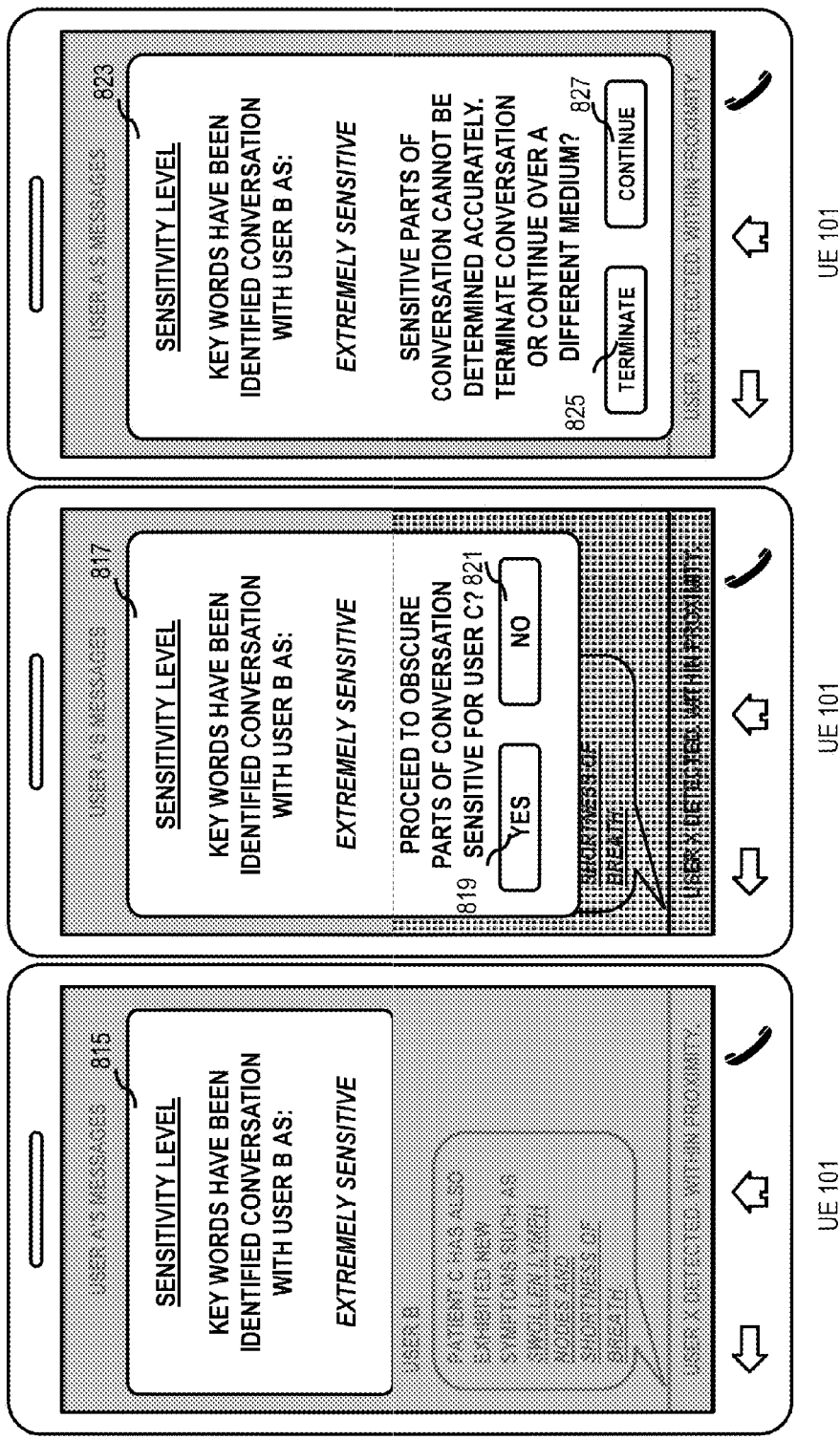

FIG. 8A-C are user interface diagrams that represents a scenario of causing one or more privacy preserving actions based on the relationship information, the identification information, the profile information, the privacy policy information, or a combination thereof, of at least one third user, according to one example embodiment. In one scenario, user A [801] and user B [803] are doctors engaged in discussion regarding user C's medical condition [805]. As soon as a person X enters the room [807], the privacy platform 109 may take several actions based on the reliability of the context detection [809]. In one example embodiment, the privacy platform 109 may identify person X as another doctor D who is also involved in user C's treatment, whereby user D is also included in the conversation [811]. In another example embodiment, the privacy platform 109 may identify person X as doctor D, who is not associated with the case of user C, despite this the privacy platform 109 may allow user A and user B to continue their conversation in the presence of doctor D because the privacy platform 109 is in a trusted relationship with doctor D [813]. In a further example embodiment, upon detecting the presence of at least one person X who is not a part of the ongoing conversation, the privacy platform 109 may determine the sensitivity level of the exchanged information between user A and user B, for example, based on the presence of the medical keywords in the conversation the privacy platform 109 may determine that the information in the conversation session is confidential [815]. Subsequently, the privacy platform 109 may impose the privacy protective measures upon identification of the one or more keywords [817], for example, certain parts of the conversation that is sensitive for user C may be obscured [819] from other users trying to access the conversation, or not [821]. Further, if sensitive parts of the conversation cannot be determined accurately [823], the privacy platform 109 may terminate the conversation [825] or continue over a different medium [827].

FIG. 9 is a user interface diagram representing a conversation context adaptation based on third party users in the vicinity, according to one example embodiment. In one embodiment, the privacy platform 109 causes a setup of collaborative context detection among the devices of the conversation participants [901]. In one scenario, user A [903, 905], user B [907, 909], user C [911, 913] and user D [915, 917] are engaged in an ongoing communication session. The privacy platform 109 detects the presence of the at least one other user in the vicinity [919, 921] and identifies and profiles the detected other user [919, 921]. Then, the privacy platform 109 determines the relationship of the detected other user [919, 921] to the ongoing conversation and its participants [923]. Subsequently, the privacy platform 109 may notify the one or more users engaged in the ongoing communication session [903, 905, 907, 909, 911, 913, 915, and 917] about the presence of the other user [919, 921] in the vicinity [925]. In another scenario, the privacy platform 109 may determine the sensitiveness level of the exchanged information and may take privacy preserving action [925], for example, by obscuring of the information in a conversation to protect the data from being eavesdropped by other users not in the communication session, or by hiding of the identity of the other user within the vicinity while declaring his/her presence to the other participants [925]. As discussed, the potential new user [919, 921] in the vicinity that can contribute to the conversation are identified and included in the conversation either directly or indirectly by relaying of messages from the users in the ongoing communication session to the at least one other user within the proximity threshold [925].

The processes described herein for determining modification to the privacy profile for information exchanged over the communication session between one or more devices in a collaborative context detection relationship based, at least in part, on the detection of the presence of the at least one other device within a proximity threshold may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
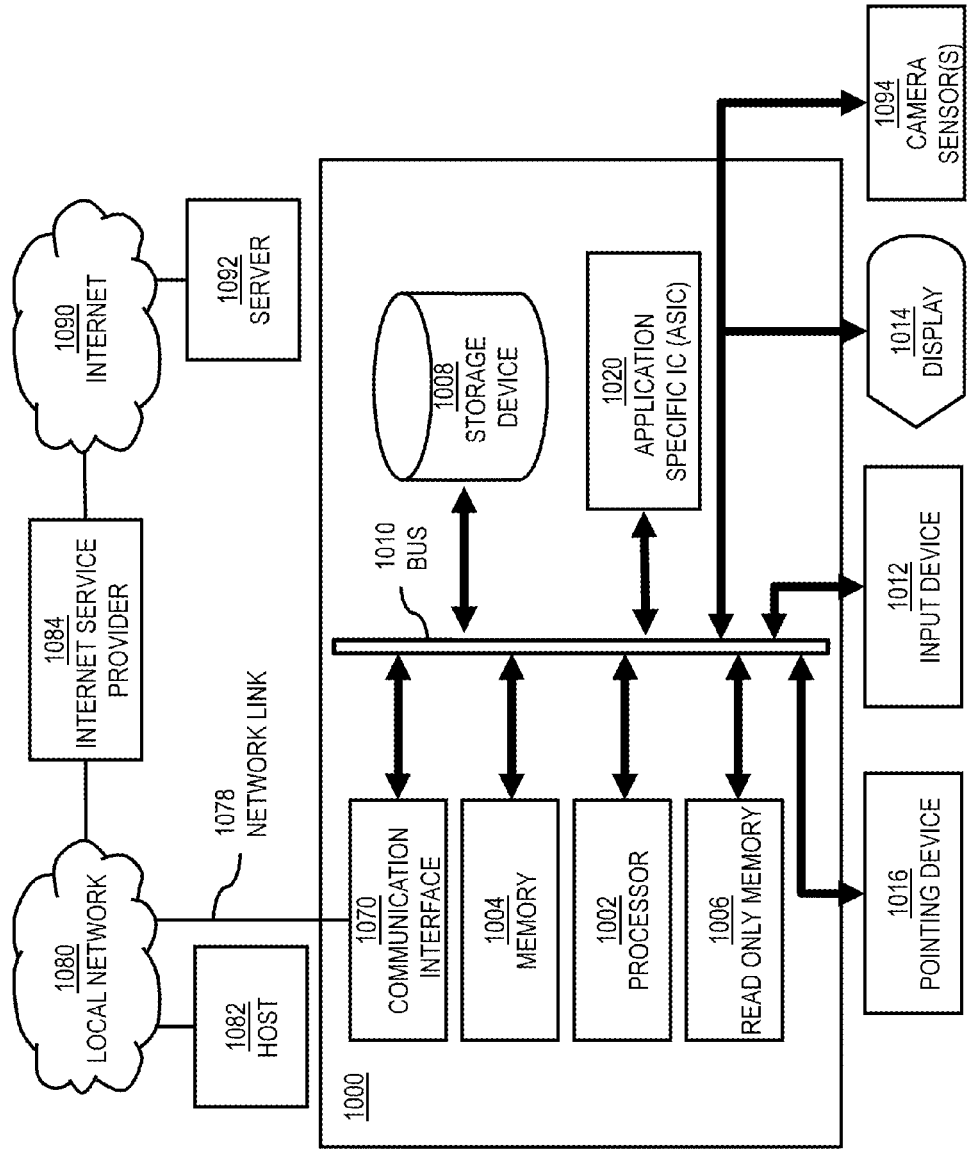
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine modification to the privacy profile for information exchanged over the communication session between one or more devices in a collaborative context detection relationship based, at least in part, on the detection of the presence of the at least one other device within a proximity threshold as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining modification to the privacy profile for information exchanged over the communication session between one or more devices in a collaborative context detection relationship based, at least in part, on the detection of the presence of the at least one other device within a proximity threshold.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determine modification to the privacy profile for information exchanged over the communication session between one or more devices in a collaborative context detection relationship based, at least in part, on the detection of the presence of the at least one other device within a proximity threshold. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for determining modification to the privacy profile for information exchanged over the communication session between one or more devices in a collaborative context detection relationship based, at least in part, on the detection of the presence of the at least one other device within a proximity threshold. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining modification to the privacy profile for information exchanged over the communication session between one or more devices in a collaborative context detection relationship based, at least in part, on the detection of the presence of the at least one other device within a proximity threshold, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for determining modification to the privacy profile for information exchanged over the communication session between one or more devices in a collaborative context detection relationship based, at least in part, on the detection of the presence of the at least one other device within a proximity threshold to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to determine modification to the privacy profile for information exchanged over the communication session between one or more devices in a collaborative context detection relationship based, at least in part, on the detection of the presence of the at least one other device within a proximity threshold as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining modification to the privacy profile for information exchanged over the communication session between one or more devices in a collaborative context detection relationship based, at least in part, on the detection of the presence of the at least one other device within a proximity threshold.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine modification to the privacy profile for information exchanged over the communication session between one or more devices in a collaborative context detection relationship based, at least in part, on the detection of the presence of the at least one other device within a proximity threshold. The memory 1105 also stores the data associated with or generated by the execution of the inventive steps.

Figure 12:
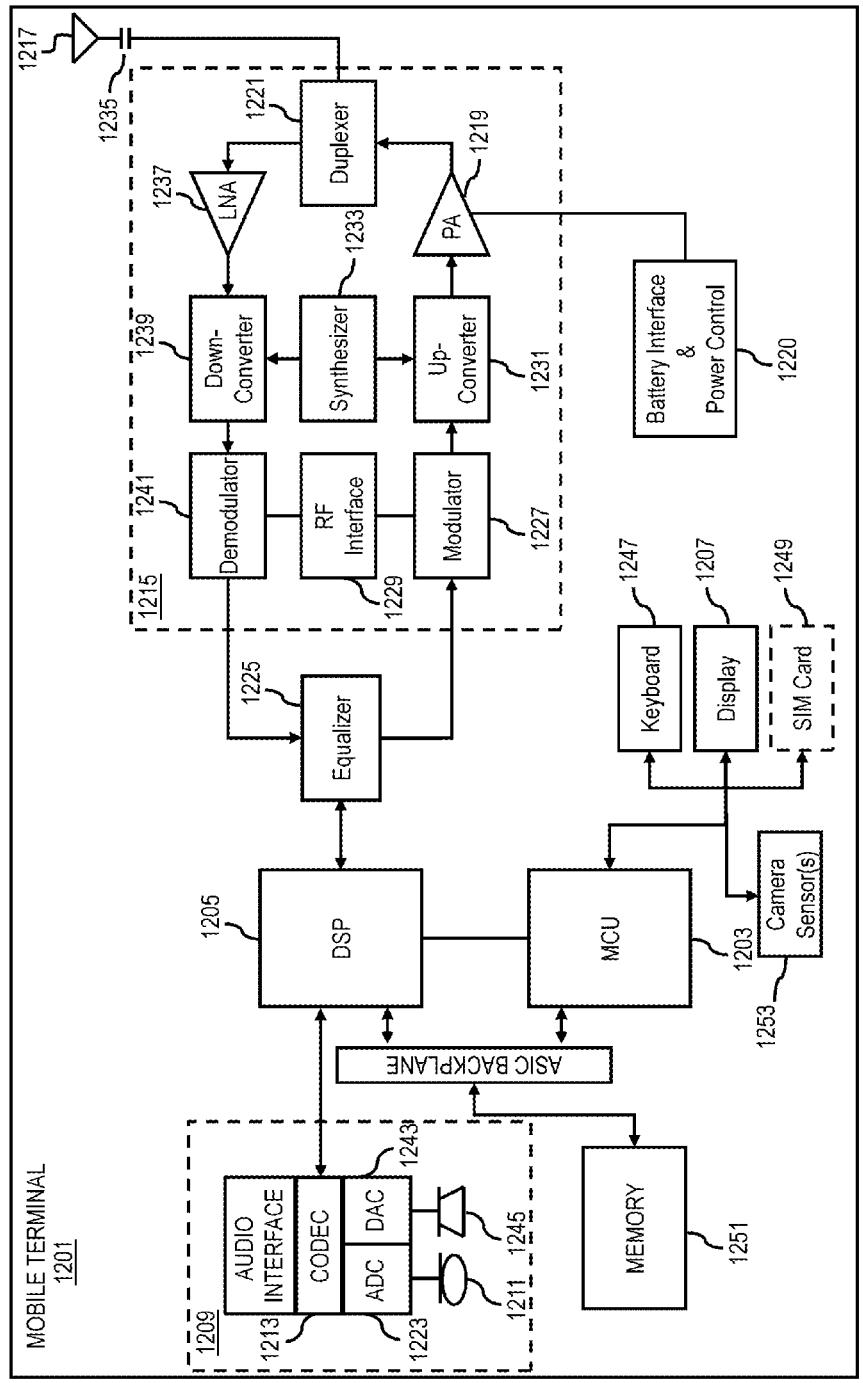
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of determining modification to the privacy profile for information exchanged over the communication session between one or more devices in a collaborative context detection relationship based, at least in part, on the detection of the presence of the at least one other device within a proximity threshold. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining modification to the privacy profile for information exchanged over the communication session between one or more devices in a collaborative context detection relationship based, at least in part, on the detection of the presence of the at least one other device within a proximity threshold. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determine modification to the privacy profile for information exchanged over the communication session between one or more devices in a collaborative context detection relationship based, at least in part, on the detection of the presence of the at least one other device within a proximity threshold. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of data and/or at least one signal, the data and/or at least one signal are based, at least in part, on the following:
    at least one determination of a communication session established between at least one first device of at least one first user and at least one second device of at least one second user, wherein the at least one first device and the at least one second device are in a collaborative context detection relationship;
    a detection of a presence of at least one third user within a proximity threshold of the at least one first device, the at least one second device, the at least one first user, the at least one second user, or a combination thereof, wherein the detection is performed via the collaborative context detection relationship;
    at least one determination of one or more modifications to one or more privacy profiles for information exchanged over the communication session based, at least in part, on the detection of the presence of the at least one third user;
    at least one determination of identification information, profile information, privacy policy information, or a combination thereof associated with the at least one third user, at least one third device associated with the at least one third user, or a combination thereof; and
    a presentation of one or more notification messages at the at least one first device, the at least one second device, or a combination thereof based, at least in part, on the profile information, privacy policy information, or a combination thereof,
    wherein the one or more notification messages relate, at least in part, to the presence of the at least one third user.

2. A method of claim 1, wherein the data and/or at least one signal are further based, at least in part, on the following:
    at least one determination of one or more other modifications to the communication session, the information exchanged over the communication session, or a combination thereof based, at least in part, on the detection of the presence of the at least one third user.

3. A method of claim 1, wherein the collaborative context detection relationship enables the at least one first device to access one or more sensors associated with the at least one second device for detecting the presence of the at least one third user.

4. A method of claim 3, wherein the one or more sensors include, at least in part, one or more internal sensors of at least one second device, one or more external sensors accessible by the at least one second device, or a combination thereof.

5. A method of claim 1, wherein the data and/or at least one signal are further based, at least in part, on the following:
    at least one determination of relationship information between (a) the at least one third user and (b) the at least one first user, the at least one second user, or a combination thereof; and
    at least one determination of whether to present at least a portion of the identification information, the profile information, privacy policy information, or a combination thereof in the one or more notification messages based, at least in part, on the relationship information.

6. A method of claim 5, wherein the data and/or at least one signal are further based, at least in part, on the following:
    at least one determination of whether to relay at least a portion of the information exchanged over the communication session to the at least one third user, the at least one third device, or a combination thereof in the communication session based, at least in part, on the relationship information, the identification information, the profile information, the privacy policy information, or a combination thereof.

7. A method of claim 6, wherein the data and/or at least one signal are further based, at least in part, on the following:
    processing and/or facilitating a processing of information exchanged over the communication session to cause, at least in part, a parsing of one or more keywords; and
    causing, at least in part, a comparison of the one or more keywords against the relationship information, the identification information, the profile information, the privacy policy information, or a combination thereof to determine whether to relay at least a portion of the information exchanged over the communication session to the at least one third user, the at least one third device, or a combination thereof.

8. A method of claim 1, wherein the data and/or at least one signal are further based, at least in part, on the following:
at least one determination of whether to cause, at least in part, an initiation of one or more privacy preserving actions based, at least in part, on the relationship information, the identification information, the profile information, the privacy policy information, or a combination thereof.

9. A method of claim 8, wherein the one or more privacy preserving actions include, at least in part, (a) obscuring of data transmitted over the communication session; (b) hiding of the presence of the at least one third user; (c) hiding of the identification information of the at least one third user; (d) hiding of other identification information of the at least one first user, the at least one second user, or a combination thereof; or (e) a combination thereof.

10. An apparatus comprising:
at least one processor; and
at least one memory including computer program code for one or more programs,
the at least one memory and the computer program code configured to, with the at least one processor, cause the apparatus to perform at least the following,
determine a communication session established between at least one first device of at least one first user and at least one second device of at least one second user, wherein the at least one first device and the at least one second device are in a collaborative context detection relationship;
cause, at least in part, a detection of a presence of at least one third user within a proximity threshold of the at least one first device, the at least one second device, the at least one first user, the at least one second user, or a combination thereof, wherein the detection is performed via the collaborative context detection relationship;
determine one or more modifications to one or more privacy profiles for information exchanged over the communication session based, at least in part, on the detection of the presence of the at least one third user;
determine identification information, profile information, privacy policy information, or a combination thereof associated with the at least one third user, at least one third device associated with the at least one third user, or a combination thereof; and
cause, at least in part, a presentation of one or more notification messages at the at least one first device, the at least one second device, or a combination thereof based, at least in part, on the profile information, privacy policy information, or a combination thereof,
wherein the one or more notification messages relate, at least in part, to the presence of the at least one third user.

11. An apparatus of claim 10, wherein the apparatus is further caused to:
determine one or more other modifications to the communication session, the information exchanged over the communication session, or a combination thereof based, at least in part, on the detection of the presence of the at least one third user.

12. An apparatus of claim 10, wherein the collaborative context detection relationship enables the at least one first device to access one or more sensors associated with the at least one second device for detecting the presence of the at least one third user.

13. An apparatus of claim 12, wherein the one or more sensors include, at least in part, one or more internal sensors of at least one second device, one or more external sensors accessible by the at least one second device, or a combination thereof.

14. An apparatus of claim 10, wherein the apparatus is further caused to:
determine relationship information between (a) the at least one third user and (b) the at least one first user, the at least one second user, or a combination thereof; and
determine whether to present at least a portion of the identification information, the profile information, privacy policy information, or a combination thereof in the one or more notification messages based, at least in part, on the relationship information.

15. An apparatus of claim 14, wherein the apparatus is further caused to:
determine whether to relay at least a portion of the information exchanged over the communication session to the at least one third user, the at least one third device, or a combination thereof in the communication session based, at least in part, on the relationship information, the identification information, the profile information, the privacy policy information, or a combination thereof.

16. An apparatus of claim 15, wherein the apparatus is further caused to:
process and/or facilitate a processing of information exchanged over the communication session to cause, at least in part, a parsing of one or more keywords; and
cause, at least in part, a comparison of the one or more keywords against the relationship information, the identification information, the profile information, the privacy policy information, or a combination thereof to determine whether to relay at least a portion of the information exchanged over the communication session to the at least one third user, the at least one third device, or a combination thereof.

17. An apparatus of claim 10, wherein the apparatus is further caused to:
determine whether to cause, at least in part, an initiation of one or more privacy preserving actions based, at least in part, on the relationship information, the identification information, the profile information, the privacy policy information, or a combination thereof.

18. An apparatus of claim 17, wherein the one or more privacy preserving actions include, at least in part, (a) obscuring of data transmitted over the communication session; (b) hiding of the presence of the at least one third user; (c) hiding of the identification information of the at least one third user; (d) hiding of other identification information of the at least one first user, the at least one second user, or a combination thereof; or (e) a combination thereof.

* * * * *